May 14, 1968 H. RADLER 3,383,464

TELEPRINTER SYSTEM WITH PLURAL FORWARD CHANNELS AND COMMON TIME-DIVISION-MULTIPLEXED RETURN CHANNEL

Original Filed Nov. 29, 1962

United States Patent Office 3,383,464
Patented May 14, 1968

3,383,464

TELEPRINTER SYSTEM WITH PLURAL FORWARD CHANNELS AND COMMON TIME-DIVISION-MULTIPLEXED RETURN CHANNEL

Herman Radler, Munich, Germany, assignor to Siemens Aktiengesellschaft, a corporation of Germany
Continuation of application Ser. No. 240,965, Nov. 29, 1962. This application Jan. 5, 1967, Ser. No. 607,581
7 Claims. (Cl. 178—50)

ABSTRACT OF THE DISCLOSURE

A circuit arrangement for teleprinter selection systems having connection paths which are adapted for duplex operation, in which the transmittal time for each connection path utilized for transmission in the forward direction is of greater duration than the corresponding transmittal time thereof, utilized for transmission in the return direction, in which for each connection path there is provided a forward direction channel over which connections are extended, and a collective return direction channel which is common to a given plurality of forward direction channels, with distributor means being provided for effecting a time-staggered allocation of said common return direction channel to the respective forward direction channels, for transmittal of the respective return transmissions of relatively short duration.

*The disclosure*

This application is a continuation of application S.N. 240,965, filed Nov. 29, 1962, and now abandoned.

The invention disclosed herein is concerned with a circuit arrangement for teleprinter selection installations or systems having connection paths adapted for duplex operation, that is, connection paths comprising respectively a separate channel for extending connections in one direction and a channel operating in the reverse direction.

It is known in the teleprinter art to provide connection paths adapted for duplex operation, that is, to make available to each connection path an individual channel operating in the direction of extending connections (forward direction channel) and a channel operating in reverse or return direction. Accordingly, subscribers involved in a connection can communicate (write) in both directions (two-way communication). However, according to experience, the writing is in most cases effected in only one direction, namely, in the forward direction in which a connection is extended, and the return direction is utilized merely at the beginning and at the end of a connection, for the transmission of station identification texts and for standard criteria such as message acknowledgements, respectively. A connection path adapted for duplex operation is consequently for the greater part of the seizure thereof utilized for message transmission only in the forward direction, while the return direction which is likewise made available, for communication, is utilized substantially only for the transmission of station identification texts and standard criteria.

The object of the present invention is to provide a circuit arrangement for connection paths adapted for duplex operation, which arrangement is free of the above noted drawback and allows a more efficient use of the corresponding equipment. According to the invention, this object is realized by providing for a given number of connection paths which are adapted for duplex operation and include respectively a forward direction channel and a return direction channel, only one collective return direction channel which is common to a plurality of forward direction channels, and distributor means for allocating said common collective return direction channel staggered as to time, to the individual forward direction channels.

The invention makes it in this manner possible to utilize for a given number of connection paths, for example, for 10 connection paths, which are adapted for duplex operation, only one collective return direction channel which is common to the respective forward direction channels, and to use idle return direction channels for other desired operations or effect savings with respect to return direction channels.

Further details of the invention will appear from the description of embodiments which is rendered below with reference to the accompanying drawing.

Figure 1:
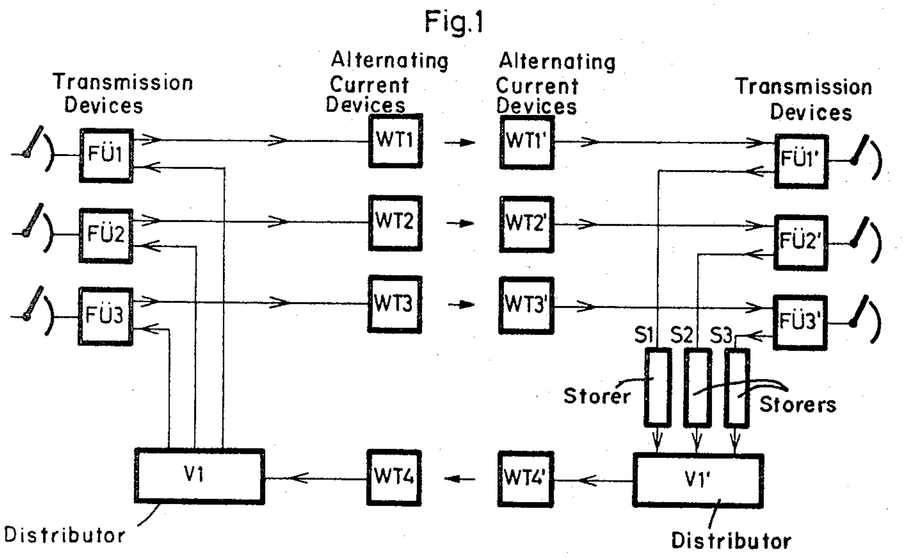
FIG. 1 shows one embodiment of the invention.

In FIG. 1 are indicated three connection paths having forward direction channels which begin respectively at the transmission devices FU1, FU2, FU3 and end at the transmission devices FU1', FU2', FU3', the representation being schematic to show the principles involved. All connection paths are adapted for duplex operation, that is, for two-way operation in forward and in return direction. The pairs of devices WT1, WT1' and WT2, WT2' as well as WT3, WT3', are alternating current devices which are respectively cooperatively associated with the corresponding forward direction channels. Other transmission systems may be used within the scope of the invention in place of the alternating current devices.

According to the invention, there is provided only one collective return direction channel for all three transmission or forward direction channels, such collective channel extending over the distributors V1 and V1' and the alternating current devices WT4 and WT4'.

Upon practicing the invention, this collective return direction channel is over the distributors V1' and V1 only temporarily operatively connected with the transmission devices FU1', FU1 or FU2', FU2 or FU3', FU3. The distributor V1' is for this purpose over stores S1, S2, S3, connected with the transmission devices FU1', FU2', FU3' at which the respective return directions begin, while the distributor V1 is directly connected with the transmission devices FU1, FU2, FU3, at which the return directions end.

More in detail, the operation of the circuit is as follows:

Assuming, for example, that the transmission device FU1 had been seized and the connection extended over the alternating current devices WT1 and WT1' to the transmission device FU1', a criterion must be transmitted from the transmission device FU1', in the return direction, to signal the conclusion of the operations required for extending the respective connection. This criterion may, for example, consist of a signal signifying prolonged space condition. The transmission device stores the corresponding information in the storer S1. The distributor V1', which controls the distributor V1 synchronously, transmits the information to the distributor V1 at a given instant, upon sampling or scanning the storer S1, the distributor V1 transmitting the information further to the transmission device FU1. The latter transmission device evaluates the criterion; the extension of the connection is thus completed.

Information given respectively to the storers S2, S3, by the transmissions FU2' and FU3', are transmitted analogously. The station identification texts given by the respective transmission devices FU1', FU2', FU3' responsive to request signal received from the corresponding transmission devices at the calling side, are successively transmitted to the transmission devices FU1, FU2, FU3 in the same manner, in the sampling or scanning rhythm of the distributor V1'.

The distributor V1' can be constructed within the scope of the invention, for example, so that it scans the entire information content of a storer and transmits such content over a circuit including the alternating current devices WT4' and WT4 and over the correspondingly set distributor V1, to a transmission device for example, to the transmission device FU1. After a storer is completely read out, the distributors V1' and V1 switch over to the next step or position. However, the distributor V1' may also operate so that it switches over, thereby also causing the distributor V1 to switch over, at an instant when it has read only part of the information contained in a storer, for example, upon reading a stored impulse combination.

In accordance with the invention, the storers may be with respect to the capacity thereof, so dimensioned, that they are adapted to accept not only brief texts, for example, station identification texts, but also normal messages which have to be retransmitted in the return direction in response to requests received for the corresponding retransmission.

Figure 2:
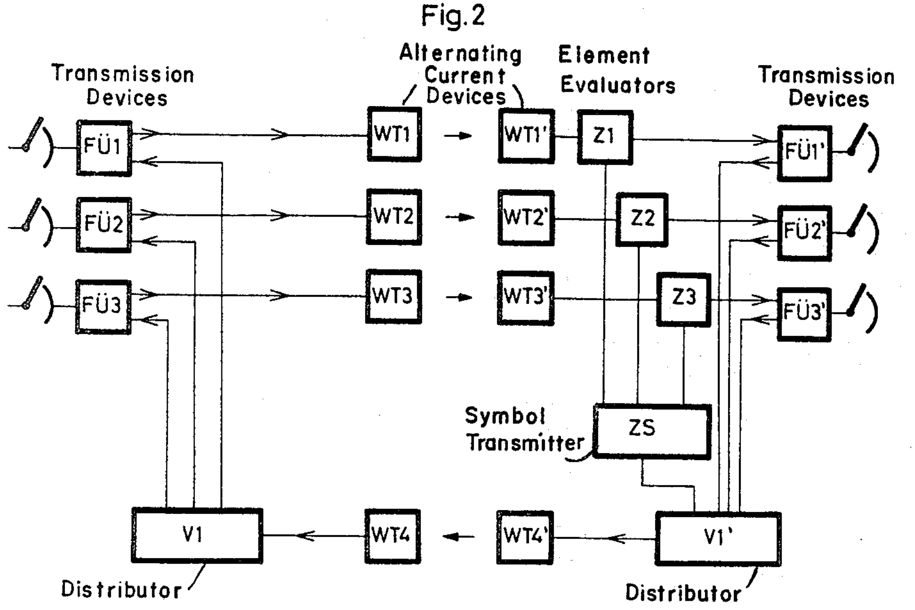
FIG. 2 shows another embodiment thereof.

The further example of the invention, shown in FIG. 2, corresponds in principle to the one represented in FIG. 1, except that the transmission devices FU1', FU2' and FU3' are connected directly with the distributor V1' instead of being connected therewith over storers. Moreover, symbol or element evaluators Z1, Z2, Z3 are inserted between the respective transmission devices FU1', FU2', FU3' and the corresponding alternating current devices WT1', WT2', WT3', such element or symbol evaluators being likewise connected with the distributor V1' in circuits extending over a symbol transmitter ZS.

The operation of this circuit is as follows:

The transmission from a transmission device such for example as FU1', in return direction, to a transmission device disposed at the beginning of a forward direction channel, for example, to the transmission device FU1, of a prolonged criterion, for example, prolonged space current, for signalling the extension of a connection, is readily possible, since the prolonged criterion given by the transmission device FU1' is retained until it has been read out by the distributor V1' and transmitted by the latter.

However, when a brief message, for example, a station identification text is to be transmitted in the return direction, the corresponding request signal is received by and evaluated in a signal evaluator, for example, Z1. The distributor V1 is thereupon operative to make the return direction channel available for the corresponding forward direction channel. The signal or symbol transmitter ZS thereupon operates to transmit the elements or signals required in accordance with the request received, such signals being extended to the corresponding transmission device over the signal evaluator. The return direction channel is at such instant already switched through and the brief message can be transmitted.

The invention is not solely limited to the circuits described herein but may include subscriber circuits or central exchange devices in place of the illustrated transmission devices.

Changes may be made within the scope and spirit of the appended claims which define what is believed to be new and desired to have protected by Letters Patent.

I claim:

1. A circuit arrangement for teleprinter selection systems having connection paths which are adapted for duplex operation, in which the transmittal time for each connection path utilized for transmission in the forward direction is of greater duration than the corresponding transmittal time thereof utilized for transmission in the return direction, comprising for each connection path a forward direction channel over which connections are extended, a collective return direction channel which is common to a given plurality of forward direction channels, and distributor means for effecting a time-staggered allocation of said common return direction channel to the respective forward direction channels for transmittal of the respective return transmissions of relatively short duation.

2. A circuit arrangement according to claim 1, comprising a transmission device respectively disposed at the beginning and at the end of each forward direction channel, said distributor means comprising a distributor at each end of said common return direction channel, storer means, connecting the transmission devices at the ends of the respective forward direction channels with the distributor at the adjacent end of said return direction channel for storage of information prior to transmittal thereof over said common return direction channel, and means for directly connecting the other distributor with the transmission devices at the beginning of the respective forward direction channels.

3. A circuit arrangement for teleprinter selection systems having connection paths which are adapted for duplex operation, comprising for each connection path a forward direction channel over which connections are extended, a collective return direction channel which is common to a given plurality of forward direction channels, and distributor means for effecting a time-staggered allocation of said common return direction channel to the respective forward direction channels, a transmission device respectively disposed at the beginning and at the end of each forward direction channel, said distributor means comprising a distributor at each end of said return direction channel, means for directly connecting the respective distributors with the transmission devices at the corresponding ends of said forward direction channels, a signal evaluator disposed in each forward direction channel, the respective signal evaluators being responsive to the receipt of predetermined signals operative to cause one of said distributors to make the common return direction channel available for the forward direction channel cooperatively associated with the corresponding signal evaluator.

4. A circuit arrangement according to claim 3, comprising a signal transmitter cooperatively associated with said one distributor, said signal transmitter being responsive to the receipt of predetermined impulse combinations operative to transmit texts signifying brief messages of which messages giving station identification are examples.

5. A circuit arrangement according to claim 3, wherein said distributors are controlled for mutually synchronous operation.

6. A circuit arrangement according to claim 2, wherein the distributor at the end of the forward direction channel is connected with a storer until the entire stored information is read out, whereupon both distributors are stepped to the next successive position thereof.

7. A circuit arrangement according to claim 2, wherein the distributor at the end of the forward direction channel is connected with a storer until it has read out therefrom a part of the information stored therein, both distributors thereupon stepping to the next successive position thereof, individual parts of the remaining stored information being read out during successive operations of said one distributor.

References Cited

UNITED STATES PATENTS

| | | | |
|---|---|---|---|
| 1,974,090 | 9/1934 | Wilson | 179—15 X |
| 2,744,159 | 5/1956 | Wright | 178—50 |
| 3,040,128 | 6/1962 | McAdams | 178—50 |
| 3,226,480 | 12/1965 | Wright et al. | 179—15 |

ROBERT L. GRIFFIN, *Primary Examiner.*

JOHN W. CALDWELL, *Examiner.*

J. T. STRATMAN, *Assistant Examiner.*